Dec. 3, 1940.  A. L. McKINNON  2,223,942
METHOD OF MAKING LINKS AND ANTISKID CROSS CHAINS THEREFROM
Filed Aug. 31, 1939
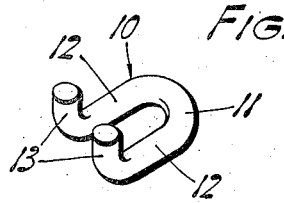
FIG. 1.
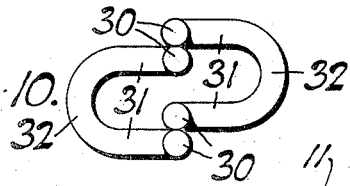
FIG. 10. FIG. 11.
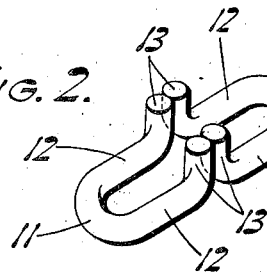
FIG. 2.
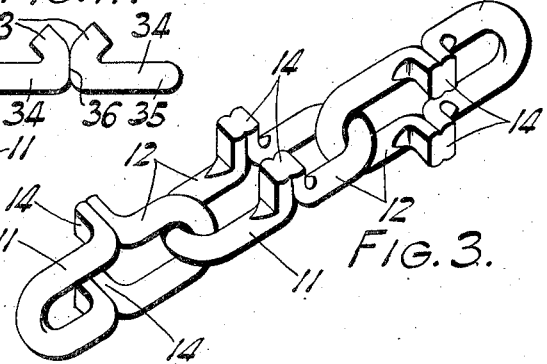
FIG. 3.
FIG. 5.
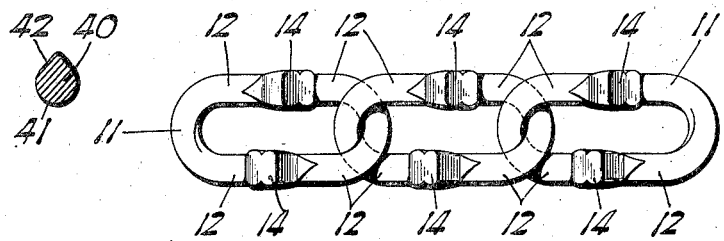
FIG. 12. FIG. 4.
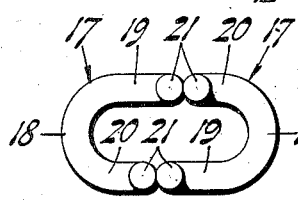
FIG. 6.
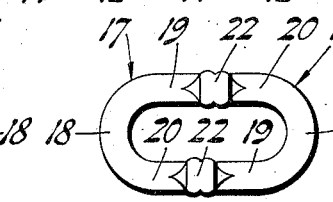
FIG. 7.
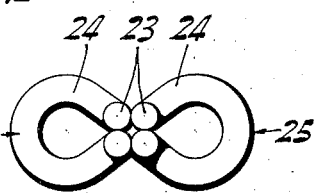
FIG. 8.
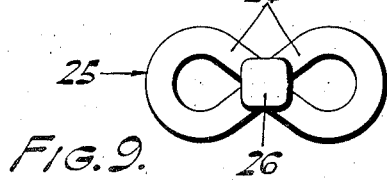
FIG. 9.
INVENTOR
ARCHIBALD L. McKINNON
BY
Beau, Brooks, Buckley & Beau.
ATTORNEYS Patented Dec. 3, 1940

2,223,942

UNITED STATES PATENT OFFICE 2,223,942

METHOD OF MAKING LINKS AND ANTISKID CROSS CHAINS THEREFROM

Archibald L. McKinnon, St. Catharines, Ontario, Canada, assignor to Columbus McKinnon Chain Corporation, Tonawanda, N. Y., a corporation of New York Application August 31, 1939, Serial No. 292,834

7 Claims. (Cl. 59—35)

My invention relates in general to a method of making links and cross chains therefrom for antiskid devices in which protuberances are formed on the road-engaging side of the chain for increasing the traction or antiskid properties of the chain, as well as the durability thereof.

It is well known to those skilled in the art that the usual link in antiskid tire chains is curbed and made of round stock. When this link is subjected to wear by contact with the roadway, the contacting curved surfaces at the ends of the link are positioned tangentially to the flat surface of the roadway when the chain is new, and these surfaces wear down by reason of the repeated contact with the roadway, whereby flat surfaces are formed. When these flat surfaces occur, obviously the strength of the link is greatly minimized and, under these conditions, if the chain links do not break under abnormal strain, they finally are weakened by wear and break under ordinary usage, thus permitting separation of the portions of the chain lying on each side of the broken link and rendering the cross chain useless.

Many attempts have been made to strengthen such links by providing protuberances of various sorts at the portions exposed to wear. Instead, however, of attempting only to reinforce the surface of the link which is subjected to wear, my invention is directed to a method of making links provided with gripping projections so positioned and proportioned as to contact with the road and take the wear for some considerable time before the curved surfaces at the ends of the link are brought into nonskid coaction with the road. Not only do the gripping projections of the link made by my method provide initial sharpened gripping surfaces when the chain is first placed in use, which is not so in the ordinary twisted link of round cross-section, but the life of the link is greatly prolonged. Furthermore, since initial wear in a chain having links made by my method is taken by the projections, the tire with which it is used is not subjected for so long a time to the wear or injury resulting from the usual sharpened edges produced eventually by the flat worn surfaces at the curved portions of the links.

The principal object of my invention therefore has been to provide a method of making a link for cross-chains having gripping projections arranged substantially midway the length of the link and to so position and proportion such projections that they will contact with the roadway and perform the gripping functions for a considerable time before the curved tangential portions of the link are brought into antiskid contact with the road, thereby greatly increasing the life of the cross chain.

Moreover, it has been an object to provide a method of making an antiskid link having gripping projections formed by the welded portions of the units making up the link.

Another object has been to provide a method of making a cross chain link in which two relatively uniform companion units are assembled and joined together by steps which may be inexpensively carried out.

Another object has been to so assemble the successive links when forming a chain therefrom, and to so twist the links after assembly, that all of the projections will be on the same side of the finished chain.

The above objects and advantages have been accomplished by the method herein described and by the invention shown in the accompanying drawing, of which:

Fig. 1 is a perspective view of one of the unit elements made in accordance with my method.

Fig. 2 is a perspective view showing two of the units assembled in position ready to be welded;

Fig. 3 is a perspective view of a number of completed links after being assembled and welded in a chain;

Fig. 4 is a plan view of a portion of a completed chain, made by my method, as it appears after being twisted;

Fig. 5 is a side elevation of the chain shown in Fig. 4 in the position it occupies when in use;

Fig. 6 is a plan view of a link made from two units having unsymmetrical leg portions;

Fig. 7 is a plan view of a completed untwisted link formed of units shown in Fig. 6;

Fig. 8 is another modified form of link showing all of the end portions brought together in a cluster;

Fig. 9 is a plan view of the link shown in Fig. 8 with the ends welded and forming a single gripping projection;

Figs. 10 and 11 show modified forms of links made in accordance with my invention; and Fig. 12 is a cross-sectional view of a modified form of link stock.

In the accompanying drawing I have illustrated a number of links made in accordance with my invention, and reference will now be made to the form of link shown in Figs. 1 to 5 inclusive. The link here shown is made up of two units 10, each comprising substantially one-half of the completed link. The wire stock used in making these links may be of any suitable cross-section, but for convenience I have shown it round. Each of these units is preferably of general U-shape having a body part 11 formed with leg portions 12, each terminating in an upturned end portion 13. Each of these portions 13 is bent at an angle of substantially 90° to the leg portion 12, and they project from the same side of the link and lie preferably in the same plane transversely of the link. The end portions are also so positioned that they lie in parallel planes extending longitudinally of the unit so that when two units are in assembled positions, adjacent upstanding end portions of the units abut each other, as shown in Fig. 2.

After the two units of the link are arranged as shown in Fig. 2 and held in this position by suitable electrode clamping means, the adjacent upstanding end portions 13 of each pair are welded together forming gripping projections 14 as clearly shown in Fig. 3. In carrying out my method any suitable means may be employed for welding the ends and I preferably accomplish such welding by the use of electricity which acts preferably in conjunction with the clamping means, as above stated.

Obviously, before the units of the second and each successive link are welded, the link parts are assembled in a previously formed and welded link so that when the assembling steps of the method are completed the chain formed by the links will have the appearance shown in Fig. 3. When assembling adjacent links, the end portions thereof are so relatively positioned that the gripping projections 14 of one link formed by welding such portions are arranged substantially at right angles to the gripping projections of the previously welded link, and in such directional relation that when the links are assembled and welded the gripping projections of the completed, untwisted chain will be arranged in helical form, as clearly shown in Fig. 3.

After the links have been assembled in a chain in accordance with my method, the completed chain is twisted from end to end until the chain assumes the form shown in Figs. 4 and 5. If the gripping projections of the links are arranged in clockwise direction, as shown in Fig. 3, then the twisting of the completed chain from end to end is also carried out in a clockwise direction. As shown in Figs. 4 and 5, after the links have been twisted, the two oppositely arranged gripping projections 14 of each link are staggered or offset. When the link is being twisted, the gripping projections 14 which, as hereinbefore stated, are formed at substantially right angles to the body part 11, maintain such right angle relationship with the body part, with the result that after the link is twisted the top surfaces of these projections will be inclined, as shown in Fig. 5, thereby presenting to the roadway sharpened edge surfaces which effectively prevent skidding. Even when these projections are worn down and the two working surfaces thereof lie in substantially the same plane, the peripheral edges of the projections will effectively grip the roadway and continue to provide effective nonskid surfaces.

The upstanding end portions 13 are so proportioned that when they are welded together and form the gripping projections 14, the outer surfaces of such gripping projections will extend considerably beyond the curved faces of the body part of the link nearest the roadway when the link is lying thereon, thereby keeping these curved surfaces of the links substantially out of wearing contact with the roadway until the gripping projections are worn down to the place where their gripping surfaces lie in the same plane as that occupied by such curved surfaces of the links, which greatly increases the life of the links.

From Fig. 5 it will be obvious that after the links are formed and twisted in accordance with my invention, the gripping projections 14 are staggered and will not track one another when the chain is moved laterally in service, whereby the gripping area of each link is extended lengthwise of the link.

Where it is desired to have the gripping projections of the links of a finished chain in line with one another longitudinally of the link, or where it is desired to have the spread of these projections greater than that shown in Fig. 5, the method may be carried out in the making of the modification of Fig. 6 and either of the results above mentioned attained by twisting the link clockwise if tracking of the projections is desired, or counter-clockwise if greater spread is desired. As shown in Fig. 6 each link unit 17 is provided with a body part 18 comprising legs 19 and 20 shaped in general U-shape formation. The leg 19 is preferably longer than the leg 20 and the upstanding end portions 21 thereof are, therefore, offset longitudinally in relation to each other. These link units are substantial duplicates as in the other form of link and when the link parts are assembled, as shown in Fig. 6, the adjacent upstanding portions 21 will be brought into contact with each other after which they are welded in a manner similar to that hereinbefore described, thereby forming gripping projections 22, as shown in Fig. 7.

If desired, my method may be carried out in the formation of a link with units having their leg portions closed, as shown in Fig. 8, and the upstanding portions 23 thereof nested together and welded in one solid projection. As shown in this figure, these upstanding portions 23 of each unit are brought together in contact with each other by causing the leg portions 24 of the body part 25 to be bent inwardly toward each other so that when a link is assembled the upstanding portions 23 of one unit will contact with similar portions of the other unit, and thus form one single gripping projection 26, shown in Fig. 9, when the upstanding portions are united by welding.

When a link of the form shown in Fig. 10 is being made by my method the upstanding end portions 30 formed at the ends of the leg portions 31 are so arranged that the body portions 32, as well as the leg portions, will be in offset or staggered relation, as clearly shown in this figure. In the form of this figure, the upstanding end portions 30 are preferably arranged at substantially right angles to the leg portions 31, as in the other form of invention.

In carrying out my invention, however, it is not essential that the upstanding end portions of the link parts be arranged at right angles to each other or that the adjacent upstanding end portions be welded throughout their entire length, since the form of invention shown in Fig. 11 may be made under my method. As here shown, the end portions 33 are bent backwardly toward the leg portions 34 and assume an angle with such leg portion which is considerably less than 90°. When two such link parts are welded together, the weld obviously does not extend the full length of the end portion 33 but only over an area indicated by the line 36. This leaves the extreme portions of the end portions 33 extending away from each other in opposite directions as clearly shown in Fig 11, whereby additional projections are provided on the link.

In carrying out my method, any suitable well-known apparatus may be used. As hereinbefore pointed out, round wire stock may be used to form the link units but stock having any other desired cross-sectional form may be used, as for instance the wire stock 40 shown in Fig. 12 which is formed with a substantial semi-cylindrical tire-engaging face 41 and with a sharp, road-engaging surface 42. When being made, the link is bent in U-shaped form, by means of such well-known apparatus, thus providing leg portions 12. After being bent in U-shaped form, the body part 11 of the unit is held firmly while the end portions 13 are bent in the same direction and at substantially right angles to the leg portions. As hereinbefore pointed out, two of such previously formed units are arranged in opposite directions, as shown in Fig. 2, with their opposite upstanding end portions 13 adjacent each other and abutting. In this position each pair of adjacent end portions is securely grasped by suitable and well-known welding mechanism (not shown) and the metal thereof is subjected to suitable heat and pressure to bring about a welding of the end portions, thus uniting the material of the two pairs of adjacent upstanding portions 13 and forming the gripping projections 14 of the completed link, as shown in Fig. 3.

In carrying out the method as applied to the form of link shown in Fig. 10, the link parts 32 are arranged in staggered relation as shown and suitable means are employed to apply a lateral pressure to each pair of adjacent upstanding end portions 30, which when welded together form a projection (not shown) similar to the projections 14 of the other form. When a link of the form shown in Fig. 11 is being made by my method, the two body parts 35 are arranged in juxtaposition and are gripped by any suitable mechanism (not shown) to force these portions together after the metal has been suitably heated and to weld them over substantially that portion indicated by the line 36.

Obviously, in carrying out my invention, as hereinbefore pointed out, the link units are engaged with a previously formed link as they are assembled and before the end portions thereof are welded, as just above described. After the desired number of links have been assembled and welded, the chain thus formed is twisted by any suitable and well-known means as, for instance, a lathe, not shown. As hereinbefore pointed out, the link units forming adjacent links are so assemble with respect to adjacent links that the projections 14 formed by welding the upstanding portions 13 of one link are arranged at right angles to the projections of the next link. When making the modified forms of links shown in Figs. 10 and 11, it is obvious that it will also be necessary to assemble these forms of links in the same manner as described, in respect to each other. Such right angled relationship of one link to a preceding link is in the same rotative direction around the axis of the chain and is, therefore, of helical form when viewed from the end of the chain. In order to bring all of the gripping projections on one side of the finished chain after twisting, it is necessary that the ends of the chain be relatively twisted in a direction which is the same as the direction of helical arrangement of the links before twisting.

While I have shown and described my method as applied to a link having upstanding ends of such proportions as to provide projections which take the initial wear of the link, it is obvious that the method is also applicable to making of links having such ends so proportioned that the curved ends of the links are brought into non-skid contact with the road at substantially the same time as such projections.

Having thus described my invention, what I claim is:

1. A method of making a link for antiskid cross chains comprising the formation of two companion link units, each having a body of substantially U-shaped formation, bending the free ends of each link unit in substantially the same direction and at an angle to the body of the unit, bringing such link units together in juxtaposition with their bodies lying in substantially the same plane and with the adjacent upstanding ends projecting from the same face of the link, and then welding the companion link units together at their ends, thereby forming gripping projections for the link.

2. A method of making an antiskid cross chain, comprising the formation of two companion link units, each having a body of substantially U-shaped formation, bending the free ends of each link unit in substantially the same direction and at an angle to the body of the unit, bringing such link units together in juxtaposition with their bodies lying in substantially the same plane and with the adjacent upstanding ends projecting from the same face of the link, then welding the companion link units together at their ends, thereby forming gripping projections for the link, then assembling the two companion units of each successive link with the next previously formed link, then welding each successive link following its assembling, and then twisting the desired number of completed links.

3. A method of making an antiskid cross chain, comprising the formation of two companion link units, each having a body of substantially U-shaped formation, bending the free ends of each link unit in substantially the same direction and at an angle to the body of the unit, bringing such link units together in juxtaposition with their bodies lying in substantially the same plane and with the adjacent upstanding ends projecting from the same face of the link, then welding the companion link units together at their ends, thereby forming gripping projections for the link, then assembling the two companion units of each successive link with the next previously formed link, and arranging the ends in such manner that when welded the gripping projections will be in helical arrangement, then welding each successive link following its assembly and then twisting the desired number of completed links in the same rotative direction as the helical arrangement of the projections.

4. A method of making a link for antiskid cross chains comprising the formation of two companion link units, each having a body of substantially U-shaped formation, bending the free ends of each link unit in the same direction and at an angle to the body of the unit, bringing such link units together in registering position with their bodies lying in the same plane and with the axes of the adjacent upstanding ends in substantially parallel planes, bringing such adjacent ends in contact with each other, and then welding the upstanding ends together, thereby forming gripping proections for the link.

5. A method of making a link for antiskid cross chains comprising the formation of two companion link units, each having a body of substantially U-shaped formation, bending the free ends of each link unit in the same direction and at substantially right angles to the body of the unit, bringing such link units together in registering positions with their bodies lying in the same plane and with the axes of the adjacent upstanding ends in substantially parallel planes, bringing such adjacent ends in contact with each other, and then welding the upstanding ends together, thereby forming gripping projections for the link.

6. A method of making an antiskid cross chain, comprising the formation of two companion link units, each having a body of substantially U-shaped formation, bending the free ends of each link unit in the same direction and at substantially right angles to the body of the unit, bringing such link units together in registering positions with their bodies lying in the same plane and with the axes of the adjacent upstanding ends in substantially parallel planes, bringing such adjacent ends in contact with each other, then welding the upstanding ends together, thereby forming gripping projections for the link, then assembling the two companion units of each successive link with the next previously formed link, then welding each successive link following its assembling, and then twisting the desired number of completed links.

7. A method of making an antiskid cross chain, comprising the formation of two companion link units, each having a body of substantially U-shaped formation, bending the free ends of each link unit in the same direction and at substantially right angles to the body of the unit, bringing such link units together in registering positions with their bodies lying in the same plane and with the axes of the adjacent upstanding ends in parallel planes, bringing such adjacent ends in contact with each other, then welding the upstanding ends together, thereby forming gripping projections for the link, then assembling the two companion units of each successive link with the next previously formed link, and arranging the ends in such manner that when welded the gripping projections will be in helical arrangement, then welding each successive link following its assembly and then twisting the desired number of completed links in the same rotative direction as the helical arrangement of the projections.

ARCHIBALD L. McKINNON.